(12) United States Patent
Bieg

(10) Patent No.: US 10,509,975 B2
(45) Date of Patent: Dec. 17, 2019

(54) METHOD AND DEVICE FOR ESTIMATING A DIRECTION OF A VIEW OF A VEHICLE OCCUPANT, METHOD AND DEVICE FOR DETERMINING A HEAD MOVEMENT GAIN PARAMETER SPECIFIC FOR A VEHICLE OCCUPANT, AND METHOD AND DEVICE FOR ESTIMATING THE DIRECTION OF VIEW OF A VEHICLE OCCUPANT

(71) Applicant: Robert Bosch GmbH, Stuttgart (DE)

(72) Inventor: Hans-Joachim Bieg, Weil im Schoenbuch (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/452,626

(22) Filed: Jun. 26, 2019

(65) Prior Publication Data

US 2019/0318183 A1    Oct. 17, 2019

Related U.S. Application Data

(62) Division of application No. 15/217,499, filed on Jul. 22, 2016.

(30) Foreign Application Priority Data

Jul. 27, 2015  (DE) .................. 10 2015 214 116

(51) Int. Cl.
    *G06K 9/00*     (2006.01)
    *G06F 3/01*     (2006.01)
    *B60W 40/08*    (2012.01)

(52) U.S. Cl.
    CPC ......... *G06K 9/00845* (2013.01); *B60W 40/08* (2013.01); *G06F 3/012* (2013.01); *G06F 3/013* (2013.01); *G06K 9/00597* (2013.01); *B60W 2420/42* (2013.01); *G06T 2207/30201* (2013.01); *G06T 2207/30268* (2013.01)

(58) Field of Classification Search
    CPC ........... G06K 9/00845; G06K 9/00597; G06F 3/012; G06F 3/013; B60W 40/08; B60W 2420/42; G06T 2207/30268; G06T 2207/30201
    USPC ......................................................... 382/103
    See application file for complete search history.

(56) References Cited

U.S. PATENT DOCUMENTS 7,460,940 B2      12/2008  Larsson et al.
2005/0073136 A1*  4/2005   Larsson ................. A61B 3/113
                                                            280/735

(Continued)

FOREIGN PATENT DOCUMENTS

WO         01/52722       7/2001

*Primary Examiner* — Amandeep Saini
(74) *Attorney, Agent, or Firm* — Norton Rose Fulbright US LLP; Gerard Messina

(57) ABSTRACT

A method for estimating a direction of view of an occupant of a vehicle. The method includes a step of ascertaining a head fixation position of the head of the vehicle occupant, terminating a current head movement of the head, using sensor data concerning an angular speed of the current head movement, and a step of combining the head fixation position and a head movement gain parameter in order to estimate the direction of view of the vehicle occupant, the head movement gain parameter being a function of a specific human head movement pattern during a visual fixing of an object.

6 Claims, 4 Drawing Sheets

(56) References Cited

U.S. PATENT DOCUMENTS

2011/0128223 A1   6/2011   Lashina et al.
2012/0069301 A1   3/2012   Hirata

\* cited by examiner

METHOD AND DEVICE FOR ESTIMATING A DIRECTION OF A VIEW OF A VEHICLE OCCUPANT, METHOD AND DEVICE FOR DETERMINING A HEAD MOVEMENT GAIN PARAMETER SPECIFIC FOR A VEHICLE OCCUPANT, AND METHOD AND DEVICE FOR ESTIMATING THE DIRECTION OF VIEW OF A VEHICLE OCCUPANT

CROSS REFERENCE

The present application is a divisional application of U.S. patent application Ser. No. 15/217,499, filed Jul. 22, 2016, and claims the benefit under 35 U.S.C. § 119 of German Patent Application No. DE 102015214116.0 filed on Jul. 27, 2015, both of which are expressly incorporated herein by reference in their entirety.

FIELD

The present invention relates to a method and device for estimating a direction of view of a vehicle occupant.

BACKGROUND INFORMATION

Estimations of the direction of view of a human observer are used in a wide variety of technical systems. For example, Trefflich, in the treatise "Videogestütze Überwachung der Fahreraufmerksamkeit and Adaption von Fahrerassistenzsystemen" ("Video-supported monitoring of driver attentiveness and adaptation of driver assistance systems"), (Technische Universität Ilmenau, 2010), describes a method for estimating the direction of view of the driver of a vehicle as a function of his current head orientation. This estimation is then used to ascertain whether the driver still has the roadway in view and is attentively following the traffic situation, in order if necessary to adapt the behavior of driver assistance systems, e.g., warning systems.

A more precise estimation of the direction of view of an observer can be obtained from measurements of the eye movements of the observer. Eye movements can be measured using video-based head and/or eye tracking systems, i.e., tracking systems for head and/or eye movements of the observer. These systems standardly first estimate the head movements of the observer on the basis of clear facial features. In a second step, the eye and specific eye features—e.g., the pupils, the sclera, or the corneal reflection—of the observer are acquired. These features are used to estimate the eye rotation and to supply a more precise estimation of the direction of view of the observer.

For example, PCT Published Application WO 01/052722 A1 describes a device for acquiring the direction of view of a user having a light source that is configured to produce a light beam in the direction of the eyes of the user, and having a detector for acquiring the light beam when it is reflected in the eye.

SUMMARY

In accordance with the present invention, a method for estimating a direction of view of an occupant of a vehicle as well as a device that uses this method, a method for determining a head movement gain parameter specific for an occupant of a vehicle as well as a device that uses this method, a method for estimating the direction of view of an occupant of a vehicle as well as a device that uses this method, and, finally, a corresponding computer program, are provided.

The design presented here enables estimations of the direction of view of an observer based on an item of information concerning the relation between head and eye movements of the observer.

This new design makes use of the fact that an orientation movement in human beings typically includes both a head movement and also an eye movement, and uses known relations between these two movements, namely on the one hand a temporal development and on the other hand a discrepancy between the two movements, when an object is visually fixed.

The approach proposed herein can enable more precise estimations of the direction of view of an observer when no information is present concerning the eye rotation and for the derivation of the direction of view only the information concerning the head orientation is available. In this way, gaps in the sensor data can be bridged in order to comprehensively increase the reliability of the head or eye tracking system.

The estimation enabled by the design presented herein of the direction of view can improve the reliability of estimations of changes in the direction of view of an observer even in environments where sensor data are meager due to limitations of the region of acquisition.

A method is presented for estimating a direction of view of an occupant of a vehicle, the method including:
ascertaining a head fixation position, which terminates a current head movement of a head of the vehicle occupant, of the head using sensor data concerning an angular speed of the current head movement; and
combining the head fixation position and a head movement gain parameter in order to estimate the direction of view of the vehicle occupant, the head movement gain parameter being a function of a head movement pattern that is individual for a vehicle occupant during a visual fixing of an object.

The method can be carried out in a street-bound vehicle. The vehicle occupant can be a driver of the vehicle. The direction of view of the vehicle occupant that is to be estimated can be presented using at least two items of position data, for example using a vector in three-dimensional space, and can provide an item of information concerning which region of an environment surrounding the vehicle occupant is visually fixed by the vehicle occupant at the end of the current head movement.

The current head movement can be a rotational movement of the head about the yaw axis or transverse axis (pitch axis), the rotational movement covering an angle that is a function of a magnitude of the movement. The head fixation position can describe a position or orientation of the head at a time at which the vehicle occupant is again holding the head relatively stably after terminating the head movement. The sensor data concerning the angular speed of the head movement can be image information acquired by an optical sensor of the vehicle and provided in the form of electrical signals.

The head movement pattern can describe a human idiosyncrasy or tendency to carry out an eye rotation and a compensatory head rotation for a visual fixing of an object. The head movement pattern can be described by mathematical equations. The head movement gain parameter that is a function of the head movement pattern can be fashioned to highlight, given a mathematical determination of the head movement pattern, a relation between a specific eye rotation and a specific compensatory head rotation during a visual fixing. The head movement gain parameter is to be provided as an adaptable value that can be a function of further quantities in addition to the relation between the eye rotation and head rotation.

This method can be implemented for example in software or hardware, or in a mixed form as software and hardware, for example in a control device.

According to a specific embodiment, in the step of ascertaining the sensor data can represent an angular speed during travel through an angle between a rest position of the head and the head fixation position of the head. For this purpose, the head fixation position is ascertained from the sensor data acquired during the head movement, which data map the angular speed. Such a specific embodiment of the approach presented here offers the advantage that a movement that is easy to acquire in modern vehicles, due to the sensor systems generally already present, can be additionally used in the form of the estimation of the direction of view. For the most part, this is because this movement during the travel through the angle between the rest position and the head fixation position can also be determined from the already-present sensor signal values, so that only a small digital or circuit outlay is required to realize the approach proposed here.

According to a further specific embodiment, the method can have a step of selecting the head movement gain parameter from a plurality of head movement gain parameters as a function of an angular size of the current head movement. In this way, computing capacity can be saved by using stored values.

In addition, the method can include a step of reading in the sensor data via an angular speed of a current head movement of the vehicle occupant via an interface of an optical sensor of the vehicle. In this way, up-to-date sensor data can always be provided in real time.

In addition, a method is presented for determining a head movement gain parameter specific for an occupant of a vehicle, the method having the following steps:
producing a head movement pattern specific for the vehicle occupant during a visual fixing of an object, using sensor data of eye eccentricity and head eccentricity of the vehicle occupant during at least one visual fixing of an object, the eye eccentricity representing an angular deviation of an eye orientation of an eye of the vehicle occupant during a movement from a rest position of the eye up to the reaching of an eye fixation position of the eye, terminating a current eye movement, and the head eccentricity representing an angular deviation of a head orientation of a head of the vehicle occupant during a movement from a rest position of the head up to the reaching of a head fixation position of the head, terminating a current head movement of the head; and determining the head movement gain parameter specific for the vehicle occupant, using the specific head movement pattern.

An angular deviation can be understood as an angle. An eye eccentricity can be understood here as the angle between a direction of view of the eyes in a rest position and a direction of view of the eyes after a fixing of an object, i.e., after an eye movement for fixing or for tracking the object. An eye fixation position can be understood as the position or direction of view of the eyes when the eyes fix the object. A head eccentricity can be understood as an angle by which the head is rotated for a fixing of an object. The eye eccentricity and the head eccentricity can have different sizes, because for example for the fixing of an object the eyes are first rotated laterally toward the object and the head is rotated by a slower subsequent movement, also in the direction of the object, and here the head does not have to be rotated as far as the eyes.

This method can be implemented for example in software or hardware, or in a mixed form of software and hardware, for example in a control device.

According to a specific embodiment of the method, in the step of producing the head movement pattern specific for the vehicle occupant, an average value of sensor data of a multiplicity of eye eccentricities and of sensor data of a multiplicity of head eccentricities of the vehicle occupant during multiple visual fixings of objects can be taken as a basis. In this specific embodiment, measurement errors can easily be eliminated.

In addition, the step of producing the head movement pattern specific for the vehicle occupant can be carried out during a specified calibration time and/or in an optical region of acquisition inside the vehicle. In this way, a head movement pattern that is specific for the vehicle occupant can easily be produced.

In the step of determining the head movement gain parameter specific for the vehicle occupant, a division can be made between a head eccentricity value of the head movement pattern corresponding to the sensor data concerning the head eccentricity and an eye eccentricity value of the head movement pattern corresponding to the sensor data concerning the eye eccentricity. Here, the head eccentricity value can be a dividend of the division, and the eye eccentricity value can be a divisor of the division. Such a specific embodiment of the approach presented here offers the advantage of an ascertaining of the head movement gain parameter that is very easy to implement digitally or in terms of circuitry, so that the approach proposed here can also be implemented at low cost.

It is also advantageous if, in the step of determining the head movement gain parameter specific for the vehicle occupant, a preset value is initialized as the specific head movement gain parameter and is updated and/or modified at prespecified time intervals with values of current sensor data of eye eccentricities and values of current sensor data of head eccentricities of the vehicle occupant.

In this way, the head movement gain parameter can be made available with a particularly short time delay.

According to a further specific embodiment, the method can have a step of ascertaining the eye fixation position using sensor data concerning an angular speed of an eye movement of the eye of the vehicle occupant during the visual fixing of an object. Advantageously, in this way the head movement gain parameter can be determined particularly precisely.

In addition, a method is presented for estimating the direction of view of an occupant of a vehicle, the method carrying out the steps of specific embodiments of the methods described above.

This method can also be implemented for example in software or hardware or in a mixed form of software and hardware, for example in a control device.

In addition, the approach presented here creates a device that is fashioned to carry out, control, or implement the steps of variants of the methods presented here in corresponding devices. Through this variant embodiment of the present invention in the form of a device, the object of the present invention can also be achieved quickly and efficiently.

In the present context, a device can be understood as an electrical device that processes sensor signals and, as a function thereof, outputs control signals and/or data signals. The device can have an interface that can be fashioned as hardware and/or as software. In the case of a realization as hardware, the interfaces can for example be part of a so-called system ASIC that contains a wide variety of functions of the device. However, it is also possible for the interfaces to be separate integrated circuits, or to be made up at least partly of discrete components. In the case of a realization as software, the interfaces can be software modules present for example on a microcontroller alongside other software modules.

Also advantageous is a computer program product or computer program having program code that can be stored on a machine-readable bearer or storage medium such as a semiconductor memory, a hard disk memory, or an optical memory, and that is used to carry out, implement, and/or control the steps of the method according to one of the specific embodiments described above, in particular when the program product or program is executed on a computer or on a device.

Exemplary embodiments of the present invention are shown in the figures and are explained in more detail below.

DETAILED DESCRIPTION OF EXAMPLE EMBODIMENTS

Figure 1:
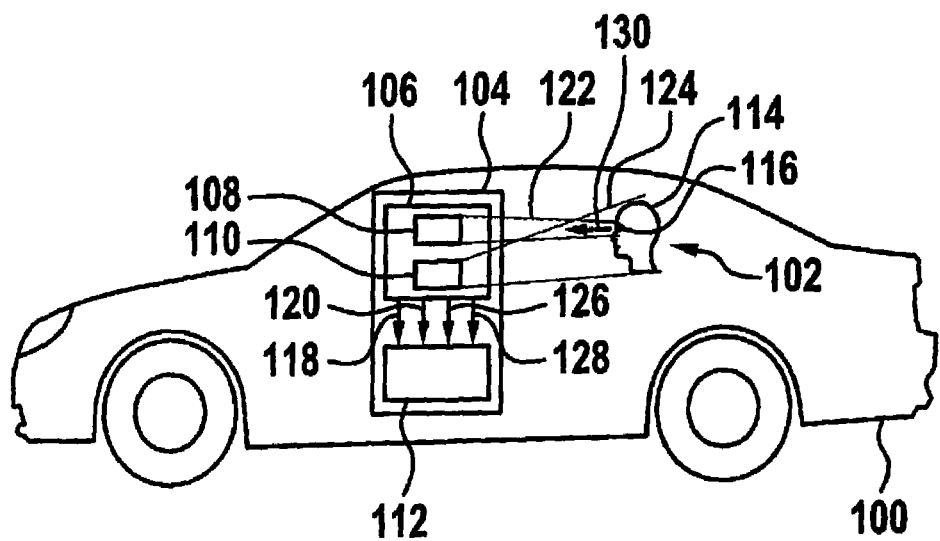
FIG. 1 shows a schematic representation of a vehicle having a device for estimating the direction of view of a vehicle occupant according to an exemplary embodiment.

In the following description of advantageous exemplary embodiments of the present invention, identical or similar reference characters are used for the elements shown in the various Figures having similar function, and repeated description of these elements is omitted.

FIG. 1 shows a schematic representation of a vehicle 100. Vehicle 100 is a street-bound vehicle such as a passenger car or truck. Also shown is a vehicle occupant 102, here a driver 102, of vehicle 100.

Vehicle 100 is equipped with a video-based movement tracking system 104 for tracking head and eye movements of vehicle occupant 102. In the following, movement tracking system 104 is also referred to as head and eye tracking system 104. The task of head and eye tracking system 104 is to determine whether vehicle occupant 102 has directed his view to the traffic scene or not, in particular when vehicle occupant 102 is the driver of vehicle 100. In the following, vehicle occupant 102 is therefore also referred to as observer 102. Using corresponding data of head or eye tracking system 104, driver assistance or warning systems of vehicle 100 can be activated as needed.

Generally formulated, the ability of a head and eye tracking system to determine the current head or eye position and orientation is a function of the general reliability of the system and its region of acquisition. In general, head tracking is more reliable than eye tracking, because the detectable facial features are present in larger number, are larger, and are more robust against external disturbing influences such as bright sunlight. For example, eye tracking systems often operate with measurements of a small reflected area on the cornea that can easily be disturbed by a bright external light source such as the sun. Such a reflected area is referred to as corneal reflection or Purkinje image.

Head tracking standardly also operates with a larger region of acquisition than does eye tracking. The orientation of the head can also be determined on the basis of visual features at the side of the head, e.g. parts of the ears.

This proves to be advantageous in situations where there are large head rotations, for example looking over the shoulder in the vehicle. Here, the head is standardly rotated by up to 90 degrees. In these situations, the system can indeed possibly still track the head, but is no longer able to acquire eye features for tracking the eye.

In sum, it can be said that estimations of the direction of view of an observer on the basis of the eye orientation are more precise than estimations based on the head orientation, but have the disadvantage of lower data reliability.

The head and eye tracking system 104 shown as an example in FIG. 1 includes a vehicle camera system 106 or a vehicle camera system 106 having at least one first optical sensor 108 and a second optical sensor 110, as well as a device 112 for estimating the direction of view of vehicle occupant 102 according to an exemplary embodiment.

Vehicle camera system 106 is situated in the interior of the vehicle. Sensors 108, 110 are oriented toward a head 114 of vehicle occupant 102. Here, first optical sensor 108 is fashioned to acquire an eye movement, in particular an eye rotational movement, of an eye 116 of vehicle occupant 102. Second optical sensor 110 is fashioned to acquire a head movement, in particular a head rotational movement, of head 114 of vehicle occupant 102. Here, first sensor 108 and second sensor 110 can also be part of an integrated sensor unit such as a video camera, in which the module for acquiring the eye movement with output of a first sensor signal can be understood as first sensor 108, and the module for acquiring the head movement with output of a second sensor signal can be understood as second sensor 110. Typically, the two sensors 108 and 110 are therefore an integrated sensor such as a video camera with which both the head pose and also the orientation of the eyes can be calculated. Differences in the quality of the calculation result, as described above, due to the differing visibility of the relevant features (e.g. nostrils for head pose estimation versus cornea reflections for estimating the eye orientation).

Device 112 is fashioned to determine an eye fixation position of eye 116, terminating the current eye movement, using sensor data 118 concerning an angular speed of a current eye movement of vehicle occupant 102, and to determine a head fixation position of head 114, terminating the current head movement, using sensor data 120 concerning an angular speed of a current head movement of vehicle occupant 102.

According to an exemplary embodiment, sensor data 118 represent an angular speed during travel through an angle between a rest position of eye 116 before the current eye movement and the eye fixation position of eye 116 when the current eye movement is terminated. Correspondingly, sensor data 120 represent an angular speed during travel through an angle between a rest position of head 114 before the current head movement and the head fixation position of head 114 when the current head movement is terminated.

A region of acquisition 122 of first optical sensor 108 for acquiring eye movements is smaller than a region of acquisition 124 of second optical sensor 110 for acquiring head movements. If observer 102 rotates the head 114 far to the left or to the right, head 114 does remain within region of acquisition 124 of second optical sensor 110, but eye 116 is moved out of region of acquisition 122 of first optical sensor 108. Thus, at the end of such a large head rotation the eye fixation position can no longer be determined, and is no longer available for determining a direction of view of vehicle occupant 102.

In addition, device 112 is fashioned to produce a head movement pattern specific for vehicle occupant 102, using sensor data 126 of eye eccentricities of eye 116 of vehicle occupant 102, and using sensor data 128 of head eccentricities of head 114 of vehicle occupant 102 during the occupant's visual fixing of objects, and, based on the head movement pattern, to determine a head movement gain parameter specific for vehicle occupant 102.

Here, an eye eccentricity represents an angular deviation of an orientation of eye 116 of vehicle occupant 102 from a rest position of eye 116 when reaching the eye fixation position of eye 116 during the visual fixing of an object. A head eccentricity represents an angular deviation of an orientation of head 114 of vehicle occupant 102 from a rest position of head 114 when reaching the head fixation position of head 114 during the visual fixing of the object.

Finally, device 112 is fashioned to estimate a direction of view 130 of vehicle occupant 102, using the head fixation position and the head movement gain parameter, when sensor data for a current head fixation position of eye 116 of vehicle occupant 102 are not available.

According to exemplary embodiments, device 112 can also use, instead of the head movement gain parameter specific for vehicle occupant 102, a general head movement gain parameter that was created based on empirical data of eye and head movements during the visual fixing of objects.

FIG. 1 shows a design having a video-based head and eye tracking system 104 having a camera system 106 directed frontally toward observer 102. Device 112 shown here can however also be used in combination with a different system or with a non-video-based head and/or eye tracking system.

Head and eye tracking system 104 supplies measurements of the current view direction angle at constant time intervals, for example 60 samples per second. System 104 is not bound to a specific sampling rate.

Figure 2:
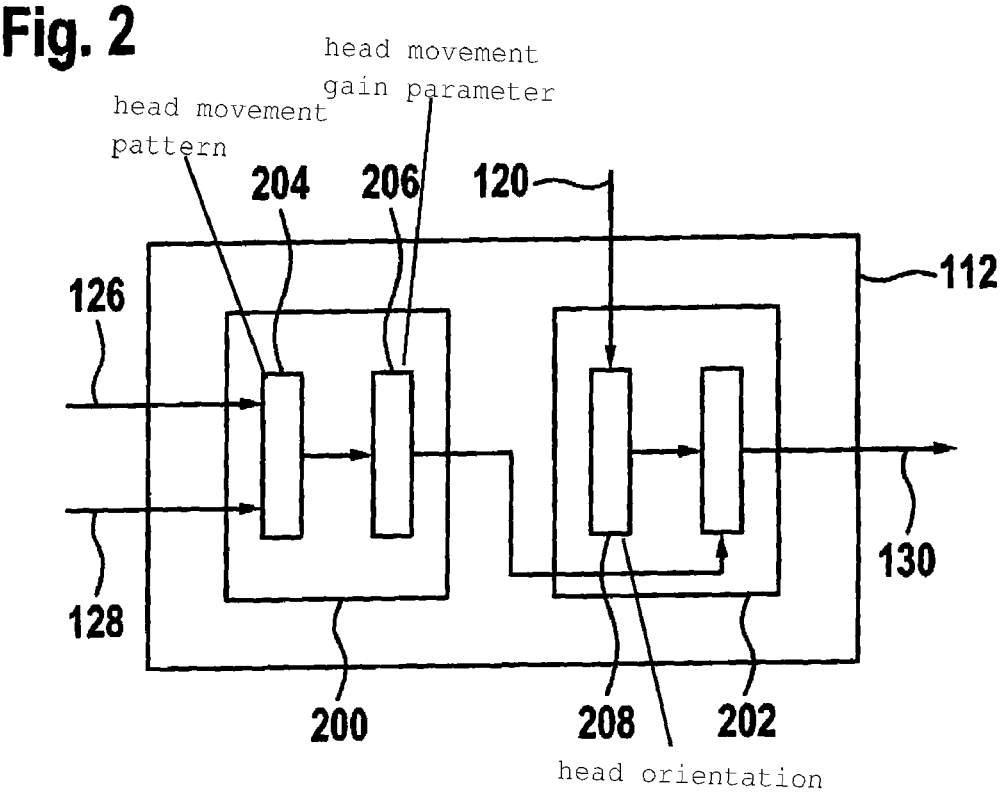
FIG. 2 shows a schematic diagram of a device for estimating the direction of view of a vehicle occupant according to an exemplary embodiment.

FIG. 2 shows a schematic diagram of an exemplary embodiment of device 112 of FIG. 1 for estimating the direction of view of a vehicle occupant. Device 112 includes a device 200 for determining a head movement gain parameter specific for an occupant of a vehicle, and a device 202 for estimating a direction of view of the vehicle occupant.

Device 200 is fashioned to read in, via a suitable interface, sensor data 126 of an eye eccentricity and sensor data 128 of a head eccentricity of the vehicle occupant during the visual fixing of an object, and to create a head movement pattern 204 that is specific for the vehicle occupant using sensor data 126, 128. Device 200 is further fashioned to determine a head movement gain parameter 206 that is specific for the vehicle occupant, using the specific head movement pattern 204, and to provide this parameter to device 202.

Device 202 is fashioned to read in, via a suitable interface, sensor data 120 concerning an angular speed of a current head movement of the vehicle occupant and to determine, using sensor data 120, a head fixation position 208, terminating the current head movement, of the head of the vehicle occupant. Device 202 is further fashioned to estimate, using head movement gain parameter 206 and head fixation position 208, direction of view 130 of the vehicle occupant.

According to an exemplary embodiment, device 112 is fashioned to analyze provided angular information of head movements, and includes for example three modules.

A first module analyzes the dynamics of the head movements in order to determine when the head reaches a relatively stable orientation, i.e. head fixation position or head fixing 208. Human orientation movements typically include a rapid—saccadic—eye movement, followed by a slow compensation movement of the head. This subsystem calculates the speed of the provided angle information of the head in order to determine when the compensation movement is terminated.

A second module then estimates direction of view 130. If an item of eye information is available, i.e. the eye of the vehicle occupant is situated within the region of acquisition of the allocated sensor and no external disturbing influences prevail, the current direction of view is derived directly from the eye information. If no eye information is available, direction of view 130 is derived solely from the head information. In this case, the system estimates direction of view 130 on the basis of the current stable head orientation 208. This module calculates direction of view (A) 130 as follows:

$$A = \gamma A_H$$

Here, $A_H$ designates eccentricity 128 of head orientation 208, i.e. the angular deviation from the rest position at 0 degrees. $\gamma$ designates gain parameter 206 specific for the observer. This individual parameter 206 is due to the circumstance that individuals have different habitual ways of rotating the head when they fix a target object with a certain eccentricity.

Alternative formulations can introduce deductive knowledge concerning general gain adaptations that are valid across different individuals, e.g. a small gain for movements having less than 15 degrees rotation and a larger gain factor for more comprehensive movements. A stepped gain function can incorporate such knowledge.

The third module, finally, is concerned with the calculation of individual gain parameter $\gamma$ 206. This parameter 206 is estimated online on the basis of changes in the direction of view that take place while both the eye information and the head information are available, i.e. for example the eye is situated within the region of acquisition of the allocated sensor and no external disturbing influences are present. In this case, data can be collected in order to compare eye and head eccentricities during the visual fixing of an object. Parameter 206 is then estimated as follows:

$$\gamma = \overline{\gamma_i} = A_H/A_E$$

Here, $\gamma$ is estimated as the average gain of multiple visual fixings i. The gain of an individual fixing is a factor of the eccentricity of the head $A_H$ and of the eye $A_E$ during this fixing; see also FIG. 7. The visual fixing includes an eye movement followed by an eye fixing with an accompanying head movement and head fixing. The eye fixing can be determined using various methods, for example a measurement as to when the eye is relatively stable, similar to the manner described above in which fixings of the head are determined.

According to an exemplary embodiment, an initial estimation of gain parameter 206 can be produced from fixings in a prespecified calibration phase in which the observer is instructed to remain within the head and eye region of acquisition.

Alternatively, parameter 206 can be initialized with a preset value that is continuously updated during the tracking time in order to be adapted to the individual head rotation habits of the observer whenever fixing data are available from both sensors, i.e. the head acquisition sensor and the eye acquisition sensor. In other words, here parameter 206 is calculated on the basis of a moving window of head and eye fixings.

Figure 3:
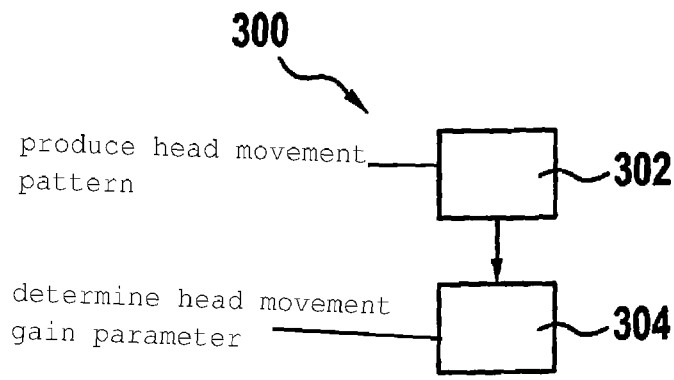
FIG. 3 shows a flow diagram of a method for determining a head movement gain parameter specific for an occupant of a vehicle according to an exemplary embodiment.

FIG. 3 shows a flow diagram of an exemplary embodiment of a method 300 for determining a head movement gain parameter specific for an occupant of a vehicle. Method 300 can be executed by the device shown in FIG. 2 for determining a head movement gain parameter specific for an occupant of a vehicle.

In a step of producing 302, a head movement pattern specific for the vehicle occupant during a visual fixing of an object is produced. For this purpose, sensor data of eye eccentricities and head eccentricities of the vehicle occupant during the visual fixing of objects by the vehicle occupant are used. In a step of determining 304, using the specific head movement pattern a head movement gain parameter specific for the vehicle occupant is determined.

Figure 4:
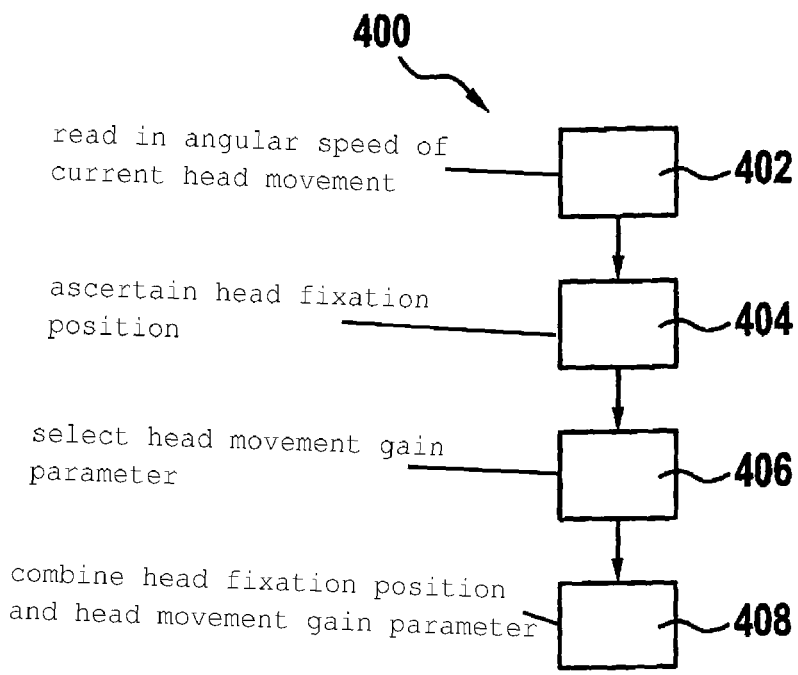
FIG. 4 shows a flow diagram of a method for estimating a direction of view of an occupant of a vehicle according to an exemplary embodiment.

FIG. 4 shows a flow diagram of an exemplary embodiment of a method 400 for estimating a direction of view of an occupant of a vehicle. Method 400 can be executed by the device shown in FIG. 2 for estimating a direction of view of a vehicle occupant.

In a step of reading in 402, via an interface sensor data from an optical sensor of the vehicle concerning an angular speed of a current head movement of a head of the vehicle occupant are read in. In a step of ascertaining 404, using the sensor data concerning the angular speed a head fixation position of the head, terminating the current head movement, is ascertained.

In a step of selecting 406, as a function of an angular size of the head movement a head movement gain parameter is selected from a multiplicity of head movement gain parameters, the head movement gain parameter being a function of a specific human head movement pattern during a visual fixing of an object. In a step of combining 408, the head fixation position and the head movement gain parameter are combined in order to estimate the direction of view of the vehicle occupant.

Figure 5:
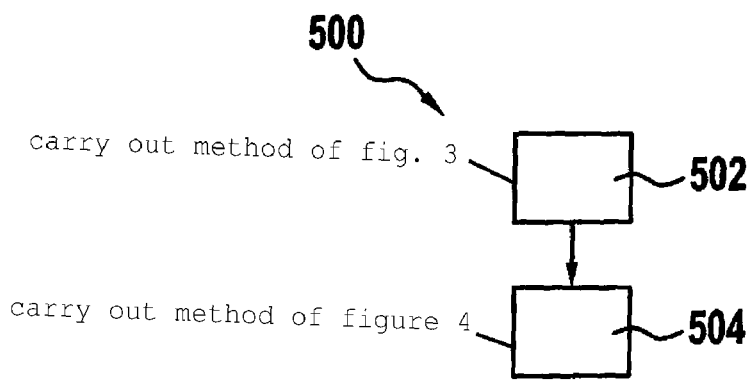
FIG. 5 shows a flow diagram of a method for estimating the direction of view of an occupant of a vehicle according to an exemplary embodiment.

FIG. 5 shows a flow diagram of an exemplary embodiment of a method 500 for estimating the direction of view of an occupant of a vehicle. Method 500 can be executed by the device for estimating direction of view shown in FIGS. 1 and 2. In a first process segment 502, method 500 carries out the steps of an exemplary embodiment of the method shown in FIG. 3 for determining a head movement gain parameter specific for an occupant of a vehicle, and in a second process segment 504 method 500 carries out the steps of an exemplary embodiment of the method shown in FIG. 4 for estimating a direction of view of an occupant of a vehicle.

Figure 6:
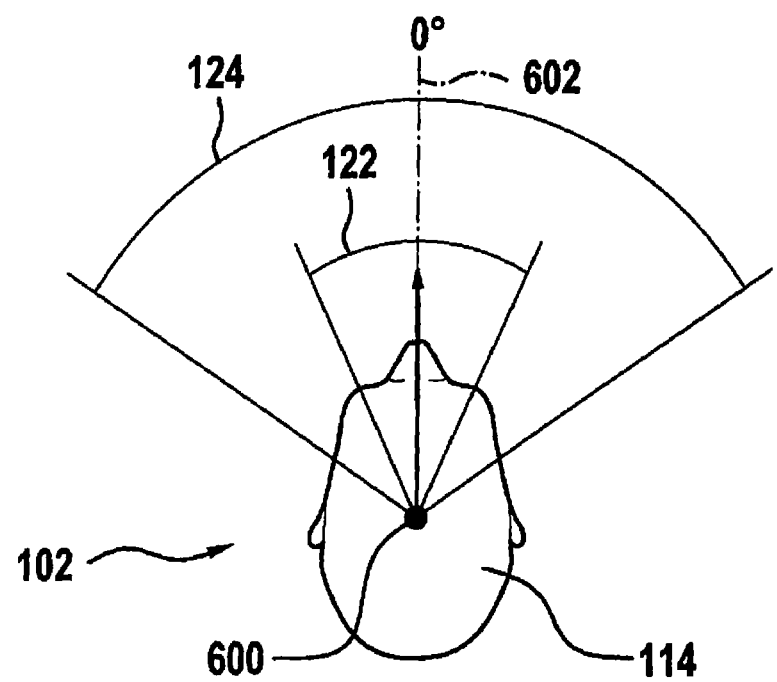
FIGS. 6 through 8 show schematic representations of a head movement as a function of a specific head movement pattern according to an exemplary embodiment.
Figure 7:
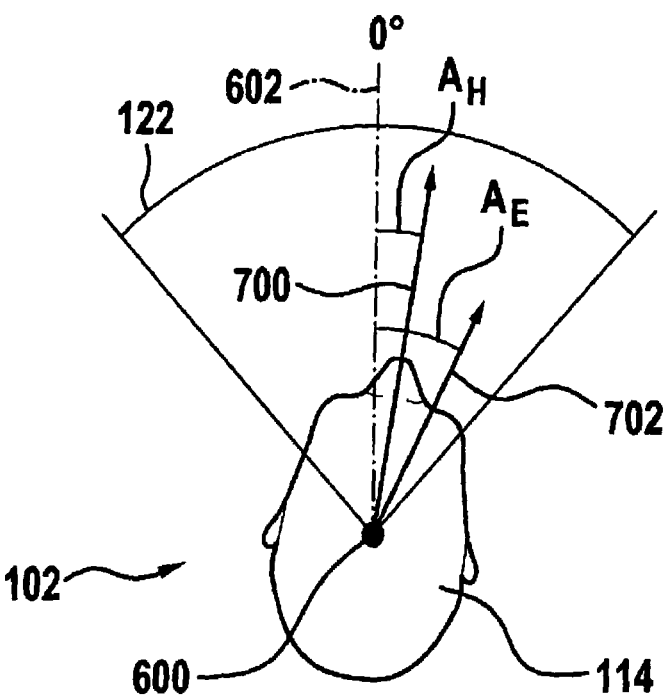
Figure 8:
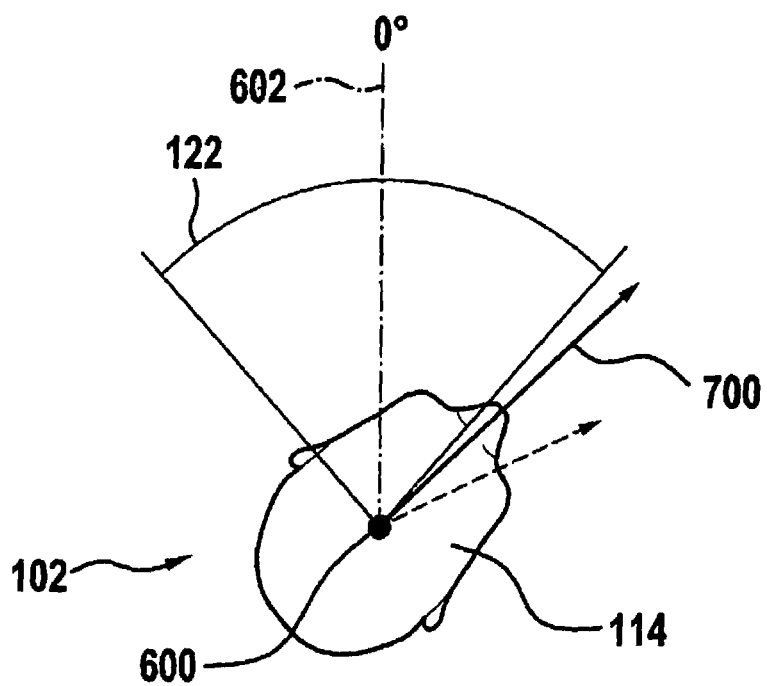

For the further illustration of the design proposed herein for estimating the direction of view on the basis of head-eye coordination, FIGS. 6 through 8 show schematic representations of a head rotation with an example of head and eye eccentricity in the visual fixing of an object.

Shown in each case is head 114 of observer 102 in a top view. A circular sector whose origin is situated at a midpoint of head 114, representing an axis of rotation 600 of head 114, represents an example of a region of acquisition 122 of the first optical sensor (not shown in FIGS. 6 through 8) directed toward head 114 for acquiring eye movements of observer 102. A further circular sector having its origin in axis of rotation 600 represents an example of a region of acquisition 124 of the second optical sensor (also not shown in FIGS. 6 through 8) directed toward head 114 for acquiring head movements of observer 102.

FIG. 6 shows head 114 of observer 102 in a rest position 602, characterized by a solid line in the representation, at 0 degrees. Observer 102 holds head 114 straight and precisely in the center within regions of acquisition 122, 124. Both head movements and eye movements, or orientations, are acquired by the allocated sensors, head orientations being acquired within head acquisition region 124 and eye orientations being acquired only within eye acquisition region 122.

FIG. 7 shows head 114 at the beginning of a head rotation to the right for the visual fixing of an object. Head 114 has already moved slightly out of rest position 602 at 0 degrees. A first vector set on axis of rotation 600 identifies a current head orientation 700 of vehicle occupant 102 in the visual fixing process. A second vector set on axis of rotation 600 identifies a current eye orientation 702 of vehicle occupant 102 in the visual fixing process. The discrepancy specific for vehicle occupant 102 between the two orientations 700, 702 can be clearly recognized.

A first angle that first vector 700 forms with rest position 602 identifies a specific head eccentricity $A_H$ for vehicle occupant 102 during the visual fixing. A second angle that second vector 702 forms with rest position 602 identifies a specific eye eccentricity $A_E$ for vehicle occupant 102 during the visual fixing.

The head movement pattern specific for vehicle occupant 102 is based on the difference between angular deviation $A_H$ of head orientation 700 from rest position 602 and angular deviation $A_E$ of eye orientation 702 from rest position 602 in the example of the visual fixing.

FIG. 8 shows head 114 at the end of the head movement upon reaching the head fixation position. The eye of observer 102 is now situated outside region 122 that can be acquired by the allocated sensor. The position or orientation of the eye can here no longer be tracked.

Standardly, current head orientation 700 supplies only a very imprecise prediction of the actual direction of view. An adaptation realized according to the design proposed here, using a gain factor, results in a better and more precise prediction of the direction of view.

Possible areas of use for the design presented here are for example in sensor technology for acquiring human movements, in particular in technologies for tracking head or eye movements in connection with driver monitoring cameras and systems.

If an exemplary embodiment has an "and/or" linkage between a first feature and a second feature, this is to be read as meaning that the exemplary embodiment according to one specific embodiment has both a first feature and the second feature, and according to a further specific embodiment has either only the first feature or only the second feature.

What is claimed is:

1. A method for estimating a direction of view of an occupant of a vehicle, the method including the following steps:
   ascertaining a head fixation position of a head of the vehicle occupant, which terminates a current head movement of the head, using sensor data concerning an angular speed of the current head movement; and
   combining the head fixation position and a head movement gain parameter to estimate the direction of view of the vehicle occupant, the head movement gain parameter being a function of a head movement pattern individual for a vehicle occupant during a visual fixing of an object.

2. The method as recited in claim 1, wherein in the ascertaining step, the sensor data represent an angular speed during travel through an angle between a rest position of the head and the head fixation position of the head.

3. The method as recited in claim 1, further comprising" selection of the head movement gain parameter from a multiplicity of head movement gain parameters as a function of an angular size of the current head movement.

4. The method as recited in claim 1, further comprising: reading in the sensor data concerning an angular speed of a current head movement of the vehicle occupant via an interface from an optical sensor of the vehicle.

5. A device configured to estimate a direction of view of an occupant of a vehicle, the device configured to:
   ascertain a head fixation position of a head of the vehicle occupant, which terminates a current head movement of the head, using sensor data concerning an angular speed of the current head movement; and
   combine the head fixation position and a head movement gain parameter to estimate the direction of view of the vehicle occupant, the head movement gain parameter being a function of a head movement pattern individual for a vehicle occupant during a visual fixing of an object.

6. A non-transitory machine-readable storage medium on which a computer program is stored, the computer program for estimating a direction of view of an occupant of a vehicle, the computer program, when executed by a processor, causing the processor to perform:
   ascertaining a head fixation position of a head of the vehicle occupant, which terminates a current head movement of the head, using sensor data concerning an angular speed of the current head movement; and
   combining the head fixation position and a head movement gain parameter to estimate the direction of view of the vehicle occupant, the head movement gain parameter being a function of a head movement pattern individual for a vehicle occupant during a visual fixing of an object.

* * * * *